United States Patent
Eckel et al.

(10) Patent No.: US 6,533,286 B1
(45) Date of Patent: *Mar. 18, 2003

(54) RADIAL SHAFT SEAL

(75) Inventors: Hans-Gerd Eckel, Laudenbach (DE); Anja Kunkel, Siedelsbrunn (DE)

(73) Assignee: Firma Carl Freudenberg, Weinheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/801,837

(22) Filed: Feb. 14, 1997

(30) Foreign Application Priority Data

Feb. 15, 1996 (DE) .......................... 196 05 550

(51) Int. Cl.⁷ ................................. F16J 15/32
(52) U.S. Cl. ...................... 277/551; 277/549
(58) Field of Search ................... 277/35, 317, 549, 277/551, 569, 572, 580

(56) References Cited

U.S. PATENT DOCUMENTS

| | | | |
|---|---|---|---|
| 4,218,813 A | * 8/1980 | Cather, Jr. | 29/450 |
| 4,815,884 A | * 3/1989 | Halliday, Jr. et al. | 403/13 |
| 4,907,811 A | * 3/1990 | Nash et al. | 277/9 |
| 5,052,695 A | * 10/1991 | Curtis | 277/9.5 |
| 5,458,420 A | * 10/1995 | Otto | 277/35 |
| 5,503,404 A | * 4/1996 | Newton et al. | 277/9.5 |
| 5,553,866 A | * 9/1996 | Heinzen | 277/9.5 |

\* cited by examiner

*Primary Examiner*—Daniel G. DePumpo
(74) *Attorney, Agent, or Firm*—Kenyon & Kenyon

(57) ABSTRACT

A seal arrangement for a shaft end. The seal arrangement includes an annular sealing lip that before use is braced on a support sleeve. The seal arrangement also includes a sensor ring that overlaps, radially inward with a flange, the sealing lip and the support sleeve, at the end facing away from the sealed space. The sensor ring is axially displaceable with respect to the sealing lip. The support ring includes at least three segments movable relative to one another and abutting against one another in the circumferential direction. The segments are fastened on the sensor ring nondisplaceably in the axial direction and displaceably outwardly in the radial direction. For easier insertion of the shaft end, the support sleeve has at the end facing the sealed space an inside diameter that is expanded in hollow conical fashion, and/or the shaft end has an outside diameter tapered in conical fashion in the opposite direction.

9 Claims, 6 Drawing Sheets

RADIAL SHAFT SEAL

BACKGROUND OF THE INVENTION

1. Field of the Invention

The present invention concerns a seal arrangement having an annular sealing lip that before use is braced on a support sleeve, as well as a sensor ring that overlaps the sealing lip and the support sleeve, at the end facing away from the sealed space, radially inward with a flange.

2. Description of the Prior Art

Seal arrangements are used in the field of motor vehicle crankshaft sealing. They include two separately produced units installed independently of one another. One of these units is a seal unit that includes an annularly configured sealing lip and which comes into engagement, during use as intended, with the crankshaft being sealed. The second unit is a sensor ring of an angular profile that is attached nonrotatably to the shaft and whose purpose is to sense rotary movements of the shaft and make them usable for the control of engine functions. The seal unit is very sensitive in mechanical terms. It includes, in particular, a sealing lip made of a polymeric material that, when slid onto the end of a crankshaft, can be damaged by the latter and become nonfunctional. The problem is particularly serious because such defects are extremely difficult to detect.

In order to remedy this drawback, it has already been proposed to support the sealing lip, until the seal unit is used, on a hollow cylindrical support sleeve which has the same outside diameter as the crankshaft being sealed. To install the seal unit, provision is made for first placing the support sleeve on the end of the crankshaft and then sliding the seal unit from the support sleeve onto the crankshaft end. This releases the support sleeve. Removal of the support sleeve is associated with a separate operation.

It is also of critical importance in terms of the function of the sensor ring that any damage to it during installation be avoided. The tooth-like elevations arranged in the vicinity of the outer periphery, which are of small dimensions and succeed one another in closely spaced fashion, are particularly sensitive in mechanical terms. It is also possible, however, to use a vulcanized-on ring made of an elastomeric material, magnetized in the radial direction with alternating N-S poles.

During use as intended, the sensor ring passes by a sensor separated by a very small gap spacing. The sensor ring thereby generates in the sensor signals that are required for the engine control system. Deformations of the sensor ring result in a deterioration in signal quality. Such deformations must therefore be avoided at all costs, which requires particular protective precautions during transport, storage, and installation.

SUMMARY OF THE INVENTION

It is the object of the present invention to provide a seal arrangement that is robust in the face of stresses which occur during storage, transport, and installation, that is easy to install, and that largely eliminates the possibility of damage to the sealing lip and/or sensor ring.

According to the present invention, provision is made for the sensor ring to be axially displaceable with respect to the sealing lip; for the support ring to include at least three segments, movable relative to one another and abutting against one another in the circumferential direction; for the segments to be fastened on the sensor ring nondisplaceably in the axial direction and displaceably outward in the radial direction; and, for easier insertion of the shaft end, for the support sleeve to have at the end facing the sealed space an inside diameter that is expanded in a hollow conical fashion, and/or for the shaft end to have an outside diameter tapered in conical fashion in the opposite direction. When the seal arrangement is placed on the shaft end, concentric location of the shaft end results automatically. Subsequent thereto, it is necessary simply to displace the seal unit toward the space being sealed and slide it onto the shaft end. The segments constituting the support sleeve are thereby automatically pulled out of the sealing lip and ultimately transferred into a position in which they are immobilized between the corresponding inside diameter of the sensor ring and the outside diameter of the crankshaft. They then no longer need to be separately removed, and can remain in the seal arrangement during utilization as intended. The sensor ring is stiffened during storage, transport, and installation by the segments of the support sleeve that are pressed together by the sealing lip. The danger that deformations will occur is thereby greatly reduced. Moreover, it is possible to configure the seal unit contained in the seal arrangement in such a way that the more sensitive parts of the sensor ring are received, at least before use, in a recess of the outer part that is closed off radially on the outside and are thereby protected from damage. Correct installation therefore no longer requires that particular protective measures be taken or that a subsequent inspection be performed.

It is has proven to be advantageous if the sensor ring is equipped in the region of the flange with radial guides for retention of the segments. Production becomes particularly simple if the radial guides are receptacles of the segments extending in the radial direction, and are guideways of the sensor ring around which the receptacles at least partly fit. Usually the sensor ring is made of metallic material. The segments can, if necessary, be made of plastic, for example polyamide. If made of such material, they can be produced particularly economically.

The guideways can be a component of the flange and, for example, can be delimited at least partly by punched-out areas of the flange. Their configuration thus also entails no particular complexity in the context of mass production.

According to a further embodiment, provision is made for the flange to be equipped, radially inside the radial guide, with at least one entrainment surface, such that the flange can be immobilized by the entrainment surface nonrotatably at the end of the shaft being sealed. The entrainment surface can optionally be a component of a opening, for example a hole or a punched-out area. The latter can optionally be produced in conjunction with manufacture of the sensor ring in the context of a deep-drawing process. In such case production is once again possible without particular complexity.

In an embodiment in which the end of the support sleeve facing the space being sealed is delimited on the inside by a hollow conical surface, it has proven advantageous if the inside diameter is approximated to the outside diameter by means of a hollow conical configuration in the region of the end of the support sleeve. The profile of the end can be slightly rounded in order to prevent damage when the sealing lip is slid on. The configuration is of substantial practical importance because with such a configuration it is possible for the outer delimiting surface of the shaft being sealed and the outer delimiting surface of the support sleeve to transition continuously into one another, avoiding any interruption. During relative displacement of the sealing lip from the region of the support sleeve to the region of the shaft end, this more or less eliminates the possibility of damage to the sealing lip.

When technical products are manufactured at different locations it is essentially impossible to achieve complete identity of desired dimensions. It is therefore customary to provide for certain tolerances. From this point of view it has proven advantageous if the outside diameter of the support sleeve is made larger than the outside diameter of the shaft being sealed. To prevent overexpansion of the sealing lip, it is necessary to make the difference in diameter small as a function of the particular material. An overdimension of 1/10 mm is generally sufficient. Even with an unfavorable diameter pairing, this excludes the possibility of the sealing lip coming into engagement, while being slid onto the shaft end, with a radially outwardly projecting step, with the resulting possibility of damage.

BRIEF DESCRIPTION OF THE DRAWINGS

The invention will be explained in more detail below by means of the drawings, in which.

DETAILED DESCRIPTION OF THE INVENTION

Figure 1:
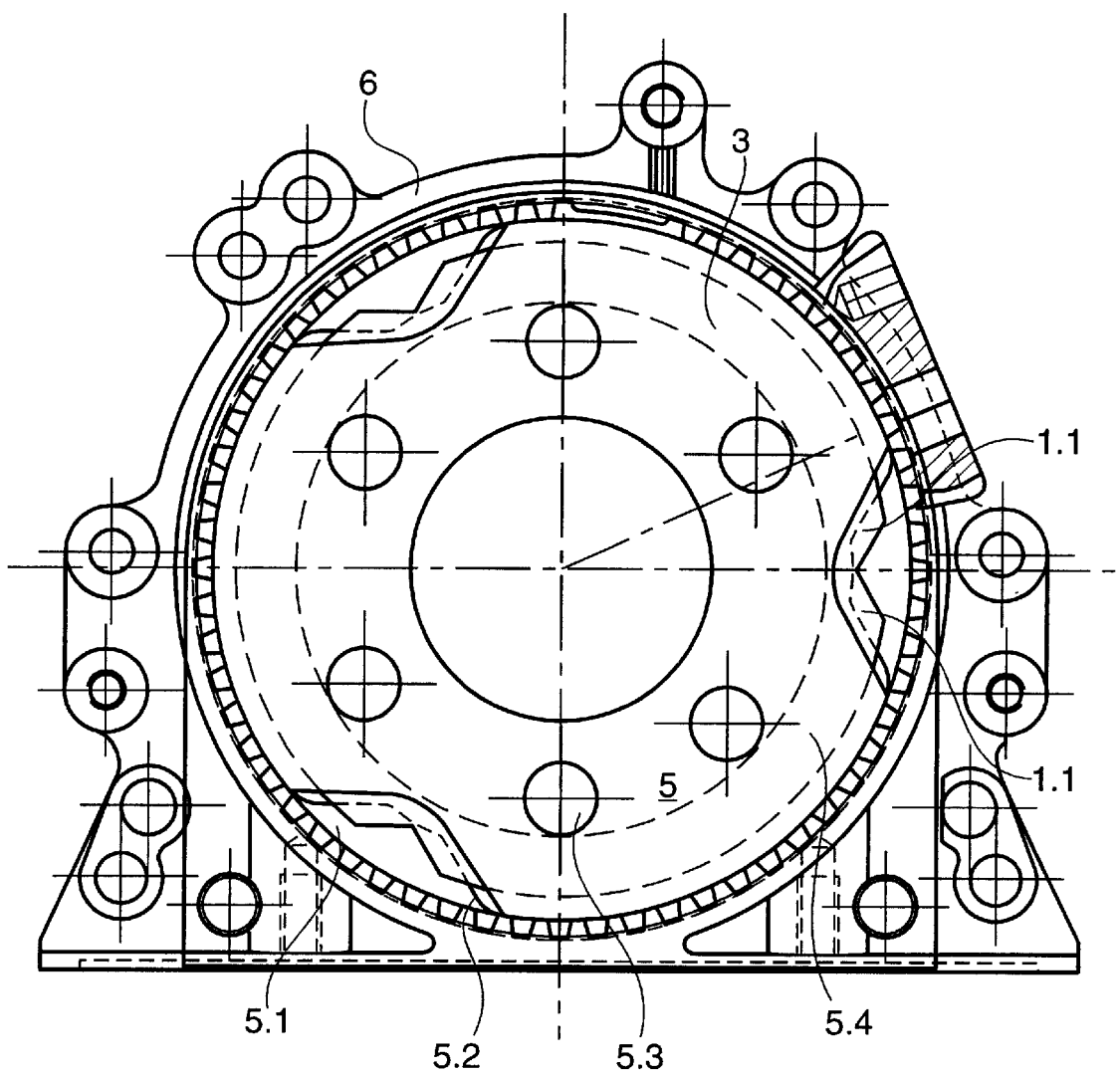
FIG. 1 shows a exemplary embodiment of the seal arrangement viewed from the front.

The seal arrangement reproduced in the drawings is intended for sealing a shaft end, in particular a crankshaft end. The seal arrangement includes an annular sealing lip 2 that, before use, is braced on a support sleeve 1, as well as a sensor ring 3 which overlaps sealing lip 2 and support sleeve 1—at the end facing away from space 4 being sealed—radially inwardly with a flange 5, the sensor ring 3 being axially displaceable with respect to the sealing lip 2. In the exemplified embodiment shown, the support sleeve 1 is constituted by three segments 1.1 which can move relative to one another and abut against one another in the circumferential direction. Segments 1.1 are fastened on sensor ring 3 nondisplaceably in the axial direction and displaceably only outward in the radial direction. Support sleeve 1 has, at the end facing sealed space 4, an inside diameter 1.5 that expands in hollow conical fashion for easier insertion of the shaft end. The radial guides are constituted by receptacles 1.2 of segments 1.1 extending in the radial direction and by guideways 5.1 of the sensor ring 3 around which the receptacles 1.2 at least partly fit. The guideways 5.1 constitute a component of flange 5 of the sensor ring 3. The guideways 5.1 are delimited in the circumferential direction by punched-out areas 5.2 of flange 5. Flange 5 is equipped, radially inside the radial guides, with entrainment surfaces 5.4 which constitute a component of openings 5.3. The openings 5.3 are constituted by holes in flange 5. Their purpose is also to couple a flywheel onto the crankshaft end, resulting in axial compression of flange 5 between the flywheel and the shaft end. Flange 5 is consequently incapable of performing any relative rotations with respect to the flywheel and the shaft end.

The inside diameter 1.5 of support sleeve 1 is expanded in hollow conical fashion in the direction of the shaft end, and joins the outside diameter of support sleeve 1. The profile of the end as such is configured in rounded fashion 1.6. This facilitates centering of the seal arrangement with respect to a shaft end, and rules out any damage to sealing lip 2 when slid onto support sleeve 1.

For a shaft diameter of 80 mm, the outside diameter of support sleeve 1 is 0.1 mm greater than the outside diameter of the shaft being sealed by sealing lip 2. The difference in dimensions can be up to 0.2 mm. This is sufficient to ensure that no damage can occur to sealing lip 2—which is made of a polymeric material—while being slid onto the shaft end.

Figure 2:
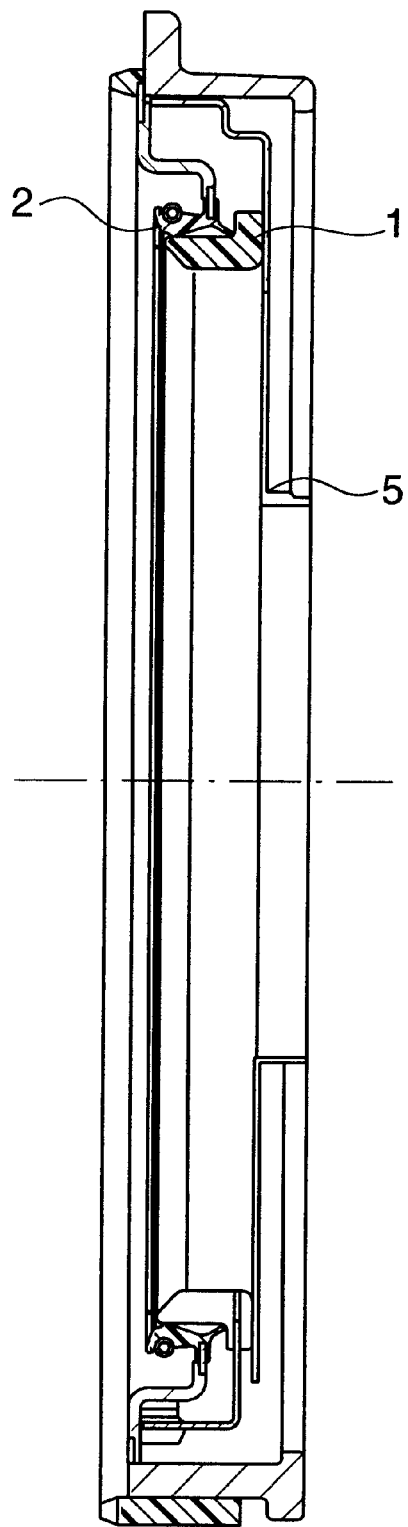
FIG. 2 shows the sealing arrangement according to FIG. 1 in a longitudinally sectioned depiction and with a sealing lip made of rubber.
Figure 3:
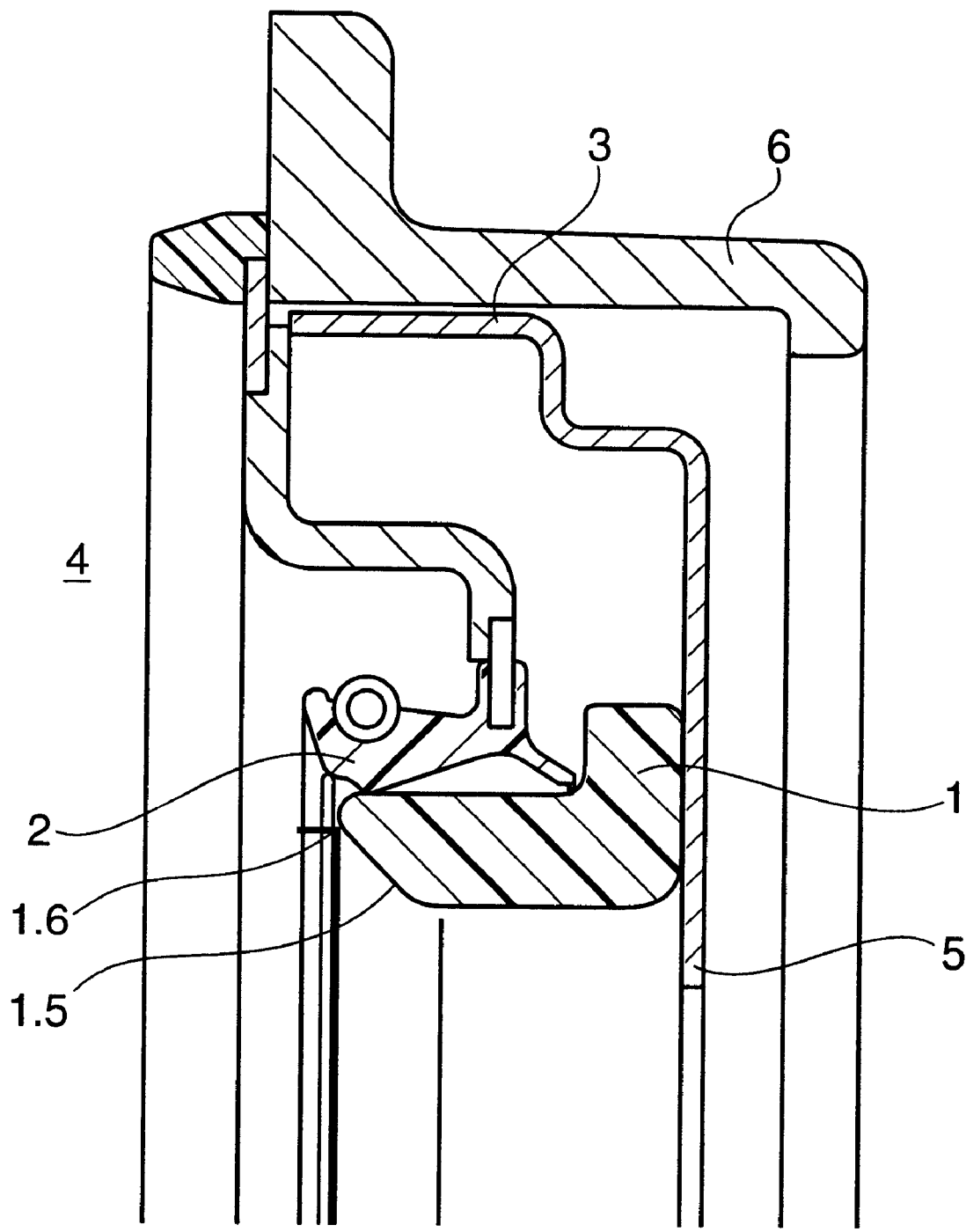
FIG. 3 shows a portion of the seal arrangement according to FIG. 2 in an enlarged depiction.
Figure 3A:
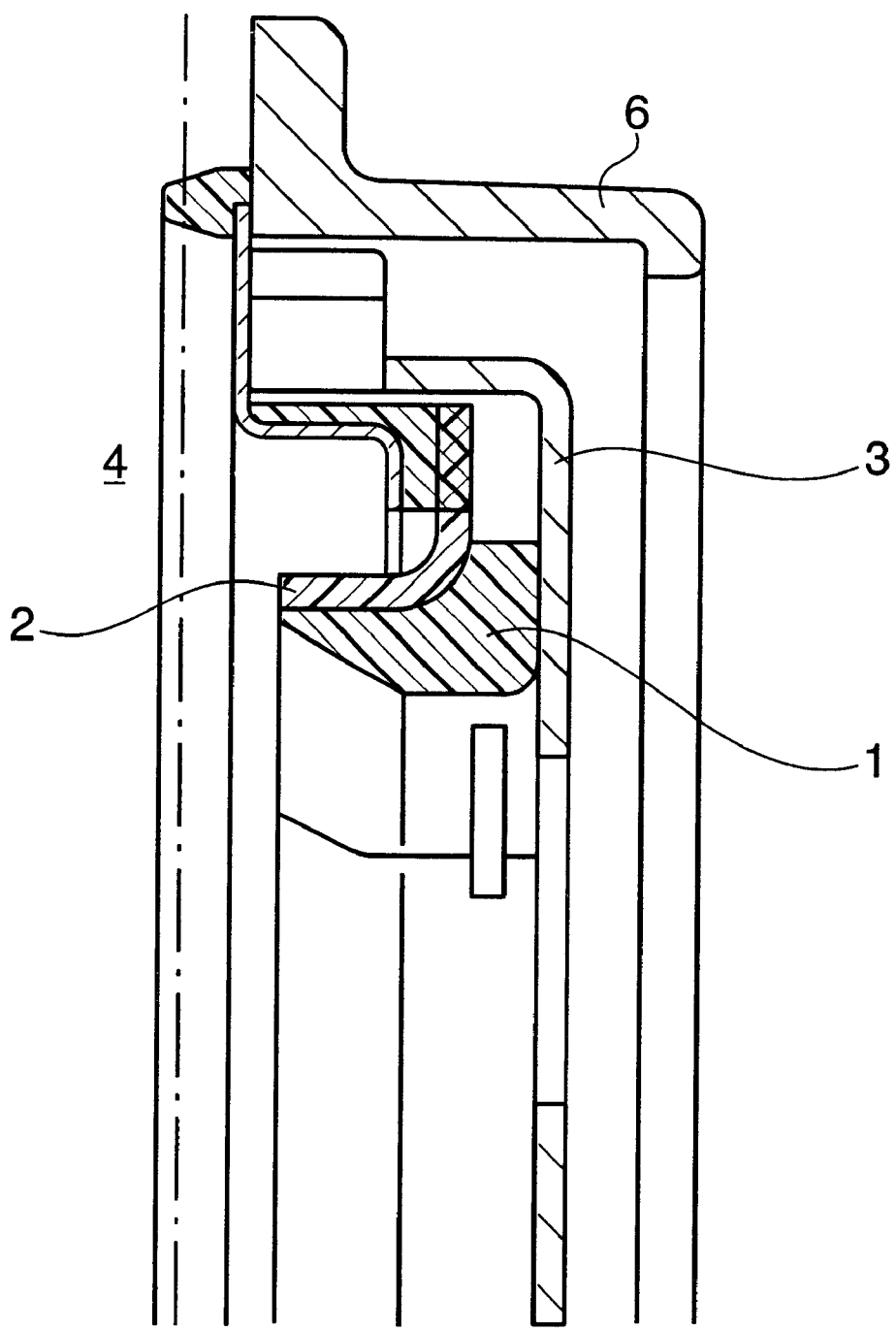
FIG. 3a shows a seal arrangement similar to FIG. 3, in which the sealing lip is made of PTFE.
Figure 4:
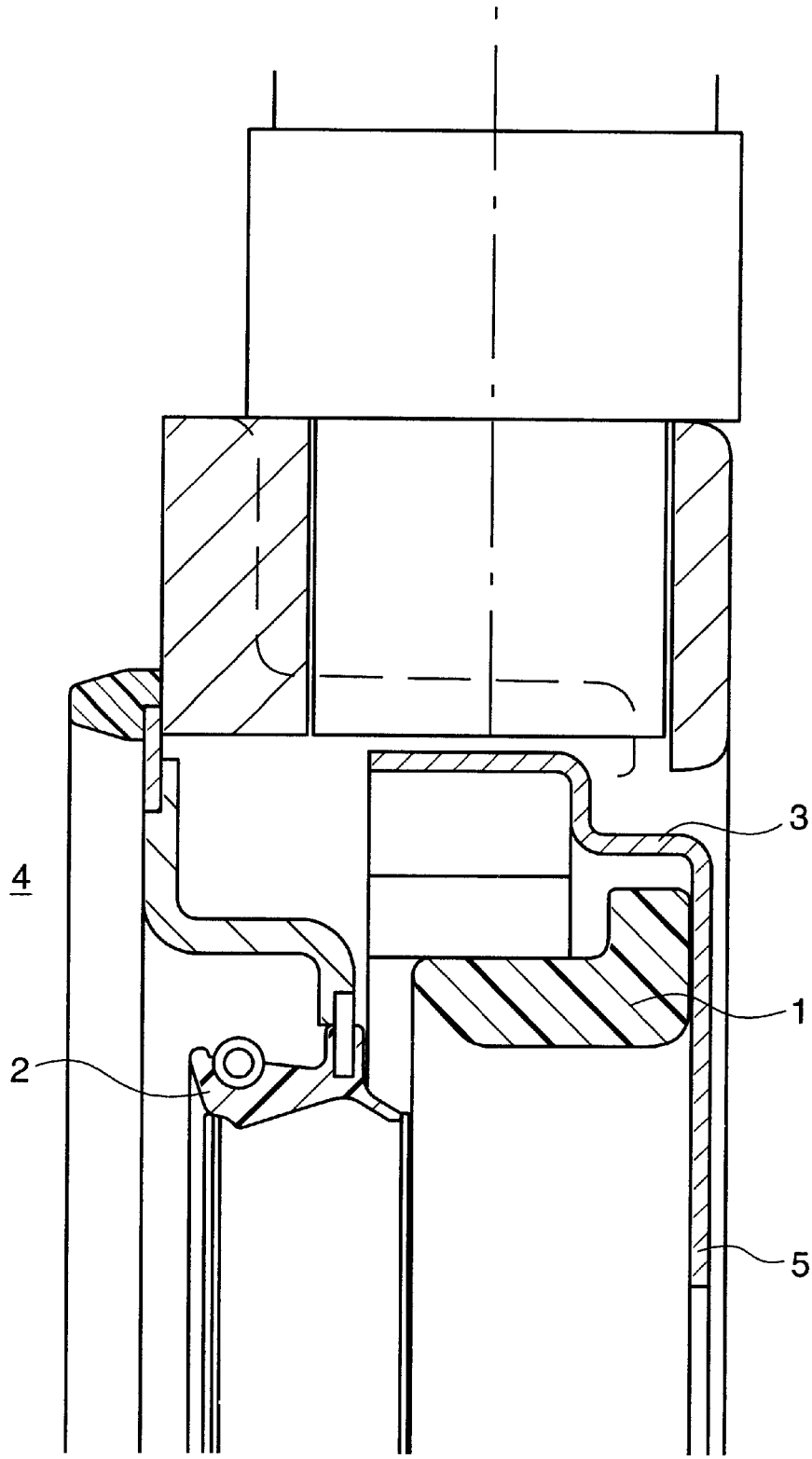
FIG. 4 shows the seal arrangement according to FIG. 1 in a longitudinally sectioned depiction, after installation is complete.
Figure 5:
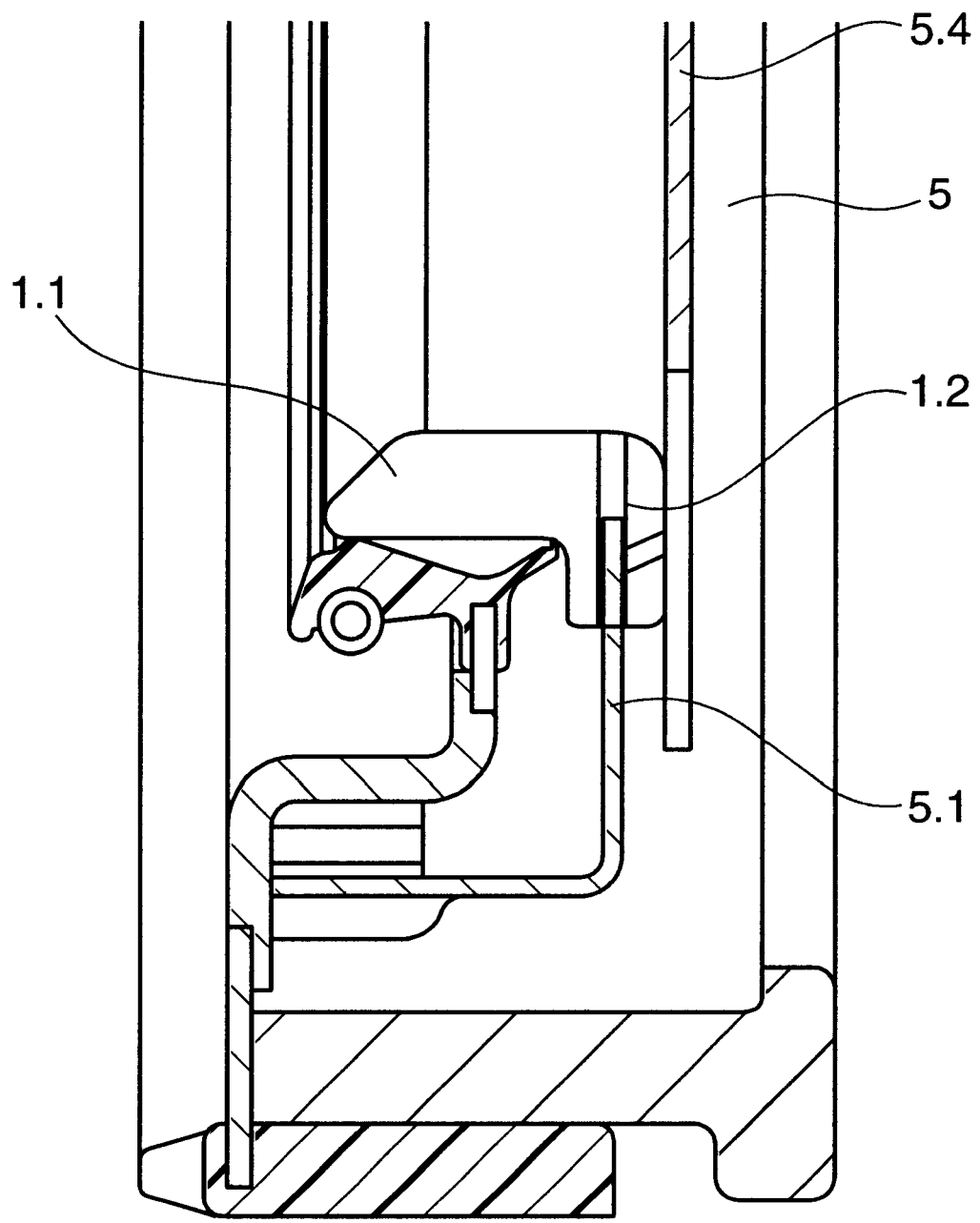
FIG. 5 shows a radial cross-section of the seal arrangement, of FIG. 1.

In the embodiment shown, every part of the seal arrangement that is sensitive to mechanical damage is enclosed, in the storage and transport state, by an outer part 6 which has the form of a shaped element made of plastic or die-cast metal. Radially inward, sealing lip 2, made of a polymeric material, is protected by support sleeve 1 constituted by three segments 1.1 that can move independently of one another. Sealing lip 2 presses the individual segments 1.1 of support sleeve 1 tightly together in the circumferential direction until installation, helping to immobilize their cylindrical shape. The individual segments 1.1 are received in guides of the sensor ring 3. The good dimensional stability of support sleeve 1 is thus transferred to sensor ring 3, which minimizes the possibility of damage thereto during storage or transport. The components of sensor ring 3 that are critical in terms of function are moreover arranged, when the seal arrangement is in its storage and transport state, at a point that is relatively far away from the open end of outer part 6 (FIGS. 2, 3, 3a). This almost completely rules out damage during installation.

What is claimed is:

1. A seal arrangement for a shaft end, comprising:

a support sleeve including at least three segments, the at least three segments movable relative to one another and abutting against one another in a circumferential direction;

an annular sealing lip braced on the support sleeve before use; and a sensor ring including a radially inward projecting flange, the flange overlapping the sealing lip and the support sleeve at an end of the sensor ring facing away from a space to be sealed, the sensor ring being axially displaceable with respect to the sealing lip in a direction away from the space to be sealed;

wherein the segments are fastened on the sensor ring nondisplaceably relative to the sensor ring in the axial direction, axially displaceable with the sensor ring with respect to the sealing lip in the direction away from the space to be sealed, and displaceably outwardly in the radial direction.

2. The seal arrangement of claim 1, wherein:

the support sleeve has, at an end facing the space to be sealed, an inside diameter that expands in a conical fashion.

3. The seal arrangement of claim 1, wherein:

the flange of the sensor ring comprises radial guides for retention of the segments.

4. The seal arrangement of claim 3, wherein the sensor ring includes guideways, and the segments include receptacles extending in the radial direction, the receptacles configured to at least partially fit around the guideways of the sensor ring.

5. The seal arrangement of claim 4, wherein:

the guideways are components of the flange.

6. The seal arrangement of claim 5, wherein:

the guideways are delimited at least partly by punched-out areas of the flange.

7. The seal arrangement of claim 3, wherein:

the flange comprises, radially inside the radial guides, at least one entrainment surface configured to nonrotatably join the flange to an end of a shaft to be sealed.

8. The seal arrangement of claim 7, wherein:

the entrainment surface includes an opening in the flange.

9. The seal arrangement of claim 1, wherein:

an outside diameter of the support sleeve is greater than the outside diameter of a shaft to be sealed.

* * * * *